US010308535B2

(12) United States Patent
Tallec et al.

(10) Patent No.: US 10,308,535 B2
(45) Date of Patent: Jun. 4, 2019

(54) BIOLOGICAL WASTE WATER PURIFICATION REACTOR AND METHOD (75) Inventors: Xavier Le Tallec, Lagny sur Marne (FR); Morten Lindegaard, Saint Maur des Fosses (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 1019 days.

(21) Appl. No.: 13/994,318

(22) PCT Filed: Apr. 3, 2012

(86) PCT No.: PCT/EP2012/056071
§ 371 (c)(1),
(2), (4) Date: Dec. 13, 2013

(87) PCT Pub. No.: WO2012/136654
PCT Pub. Date: Oct. 11, 2012

(65) Prior Publication Data
US 2014/0083941 A1    Mar. 27, 2014

(30) Foreign Application Priority Data

Apr. 4, 2011  (EP) .................................. 11305389

(51) Int. Cl.
*C02F 3/10*   (2006.01)
*C02F 3/12*   (2006.01)

(52) U.S. Cl.
CPC ............... *C02F 3/104* (2013.01); *C02F 3/10* (2013.01); *C02F 3/1226* (2013.01); *Y02W 10/15* (2015.05)

(58) Field of Classification Search
CPC .. C02F 3/06; C02F 3/2806; C02F 3/10; C02F 3/104; C02F 3/085; C02F 3/087; C02F 3/2833
USPC .................................................. 210/615, 617
See application file for complete search history.

(56) References Cited

U.S. PATENT DOCUMENTS 4,198,301 A * 4/1980 Iwatani ................ B01D 24/165
                                                              210/274
4,253,947 A   3/1981 Fan et al.
4,322,296 A * 3/1982 Fan ........................... B01J 8/20
                                                              210/610

(Continued)

FOREIGN PATENT DOCUMENTS

EP    0347296    * 12/1989
EP    0750591    *  1/1997
JP    06-023382     2/1994

OTHER PUBLICATIONS

Desbos, English machine translation FR 2604990, Apr. 15, 1988, pp. 1-13.*

(Continued)

*Primary Examiner* — Claire A Norris
(74) *Attorney, Agent, or Firm* — Coats & Bennett PLLC (57) ABSTRACT A biological reactor for treating wastewater. The reactor includes a gas injection system and a system for directing wastewater into the reactor. Further, the reactor includes a biological filter comprised of a packed bed of biofilm carriers and a volume of moveable biofilm carriers. During the method of treating the wastewater, the wastewater moves upwardly through the reactor and through the biological filter while gas is emitted from the gas injection system.

8 Claims, 5 Drawing Sheets

(56) References Cited

U.S. PATENT DOCUMENTS

| | | | | |
|---|---|---|---|---|
| 5,019,268 A | * | 5/1991 | Rogalla | B01J 8/22 |
| | | | | 210/151 |
| 2007/0284294 A1 | * | 12/2007 | Jackson | C02F 3/10 |
| | | | | 210/150 |

OTHER PUBLICATIONS

English machine translation EP 0347296, Rogalla, Dec. 20, 1989, pp. 1-3.*

* cited by examiner

BIOLOGICAL WASTE WATER PURIFICATION REACTOR AND METHOD

This application is a U.S. National Stage Application of PCT Application No. PCT/EP2012/056071, with an international filing date of 3 Apr. 2012. Applicant claims priority based on European Patent Application No. 11305389.6 filed 4 Apr. 2011. The subject matter of these applications is incorporated herein.

FIELD OF THE INVENTION

This invention relates to the area of biological purification of wastewater, especially municipal wastewater, industrial wastewater and water and distribution water to be made into drinking water. It specifically relates to a purification process wherein the water to be treated and oxygenated gas are sent in ascending co-currents in the same reactor or biological filter comprising a packed bed and a volume of movable carriers as a biological filtering material.

BACKGROUND OF THE INVENTION

It is known that the biological treatment, for example of water, consists in degrading the organic impurities by the action of a purifying biomass that is free or fixed and that contains a variety of micro-organisms such as bacteria, yeasts, protozoa, metazoa etc. In the method using free biomass, such as activated sludge, high concentration of the various species of micro-organisms which have little settling capacity, is impossible to achieve inasmuch as the concentration of the biomass is obtained by settling. The method is therefore limited as regards the load applicable in terms of BOD (biological oxygen demand) and COD (chemical oxygen demand). In a system with a fixed biomass, the concentration of the biomass (with the bacteria) is achieved by making the bacteria cling to a carrier medium. The settling capacity is then no longer the essential criterion and this technique possesses a purification potential far greater than that of standard methods.

Among the most efficient methods based on the principle of purification with fixed biomass, we may cite notably those patented and developed by the Applicant, in a single upflow reactor of a granular bed constituted by two zones having different granulometry and different biological characteristics (French patents No. 76 21246 published under No. 2 358 362; No. 78 30282 published under No. 2 439 749; No. 86 13675 published under No. 2 604 990).

In the so-called free biomass techniques, reference will be made here especially to methods using fluidized beds wherein the material used as the biofilter consists of products with a density of less than 1 such as, for example, expanded polymers, according to processes which are now in the public domain (French patent No. 1 363 510 dated 1963; U.K. patent No. 1 034 076 dated 1962), various variant embodiments of which have led to numerous invention patents (French patents Nos. 330 652, 2 406 664, 2 538 800; U.S. Pat. No. 4,256,573; Japanese patent No. 58-153 590 etc.).

The use of these floating materials and of fluidized granular beds is promising in itself but entails a number of difficulties and frequently shows drawbacks. For example, if materials heavier than water (such as sand or similar materials) are fluidized, then a considerable input of energy is needed for the pumping of the liquid and it is difficult to control the keeping of the materials inside the reactor. To overcome this drawback of energy consumption, it has been proposed to use a fluidized bed with light materials, having lower density than water, with an insufflation of air at the base of the bed but with a supply of descending water (U.S. Pat. No. 4,256,573 and Japanese patent No. 58 153590 referred to here above). However, from a certain downflow speed of the water, the air bubbles are trapped within the material or else carried along by the liquid flow and it is not possible to aerate the reactor properly.

The difficulties of the prior art have been overcome by the development of a system as disclosed in Applicant's application EP0504065, wherein in a single reactor or biological filter with ascending co-currents of water and gas, the filtration means and bacteria support medium used is a fixed bed of particles having lower density than water with a density of 35 to 65 kg/m$^3$. Especially preferred is the use of expanded polystyrene balls with a granulometric size ranging from 2 mm to 6 mm The reactor of EP0504065 comprises from bottom to top: a zone for the expansion and removal of sludge of the media and settling of loosened sludge; at least one air injection device; a zone of filtering material constituted by a layer of the above-mentioned light particles, a ceiling made of concrete or other perforated material and, finally, at the top of the reactor, a washing water storage zone at the tip of which there is provision for the removal of the treated effluent.

Another reactor developed by the Applicants is disclosed in EP0347296, wherein the reactor is equipped with a lower fluidized bed and an upper fixed bed for filtration. The particles in the beds are composed of expanded particles having a density of less than 1. The particles of the fixed bed are both smaller and lighter than those of the fluidized bed.

In this system also a single reactor or biological filter with ascending co-currents of water and oxygenated gas is used. For the combination of the two aforementioned superposed beds, the process according to EP0347296 implements materials that are lighter than water but whose properties of granulometry, density, bed height vary, so that on the one hand a fluidization of the lower bed during the injection of the oxygenated gas without appreciable perturbation of the upper bed, and, on the other hand, an "automatic" reclassification of the two layers or beds during the phase in which the light materials expand when washed with a countercurrent is achieved.

At rest, these two layers of materials lighter than water stick together because of their different densities. This classification is maintained while the filter is washed with the counter current. When air is introduced into the base of the filter by a diffusion device, the air and water mixture passing through the materials has a similar density to the particles in the aforementioned lower layer. The lower bed in this case is fluidized by the ascending movement of the oxygenated gas bubbles, which causes an intensive exchange between the gases, the water to be treated and the "biofilm" which adheres to the particles of the bed.

For the lower fluidized bed, the granulometry can vary from 3 to 15 mm, the volume mass is generally between 300 and 800 g/l and the height of the bed ranges from 0.2 to 2 meters depending on the type of reactor used; in the upper fixed bed, the average diameter of the light particles is from 1 to 10 mm, while the volume mass varies from 20 to 100 g/l and the height can vary from 0.5 to 3 meters. Finally, in the case of the aforementioned variation, the upper layer over mounting the upper bed comprises particles from 3 to 20 mm in size, having a volume mass of 10 to 50 g/l and a height or thickness of 0.10 to 0.50 meters.

The particles of light materials that can be used as a filtering medium/bacterial support are expanded plastic materials, closed-cell materials from polyolefins, polystyrene, synthetic rubber polymers and copolymers, etc.; light mineral materials such as clay or expanded shale, or cellulosic products such as wood particles, for example. The granulates of these materials can be in various forms, such as, advantageously: balls, cylindrical pods, etc. In practice, for the effective execution of the process, it is important for the densities of the light particles used within the context of the invention to be increasingly low as we move from the lower layer (fluidized bed) to the upper layer, and then to the aforementioned support layer. For example, the density ranges can respectively be: 0.5 to 0.8 (fluidized bed); 0.3 to 0.1 (fixed bed) and 0.005 to 0.08 (upper support bed).

In another application FR2741872 Applicant discloses another water treatment reactor in which a fixed bed and a fluidized bed are combined. The reactor has a first filtration zone of rigid PVC material with fixed 3D structure and a second filtration zone packed with filling material, like for example expanded polystyrene balls, that has a lower density than water and is fixed. Since a frequent problem of such reactors is the particle loss during backwashing in counter current this reactor provides for a space between the two zones that allows expansion of the fixed bed of the second filtration zone during washing. Means of oxygen injection are placed in this space. Oxygen is therefore only injected above the first zone, which stays anoxic. The air only goes into the second zone. In this reactor two different zones are combined, one for denitrification, the other for nitrification.

The particles as used in these bioreactors do not provide for any protected surface area for growth of the biofilm on the particles, since the particles used are small spheric particles. The biofilm can therefore grow only on the surface of the spherical particles, which is not protected from any damage that may be caused by collision of the spherical particles.

In contrast to that carriers as disclosed in EP0750591 are large and provide a large surface for the biofilm, protected against wear, without the efficiency of the process being heavily reduced by a still greater oxygen limitation of the biofilm than in available small carriers.

The large carrier elements of EP0750591 have a structure similar to a turbine wheel with radial inside walls that are interconnected by outer rings and forming several axial passages. The large area of inner surfaces of the carrier is thus protected against wear against the surfaces of other carriers. Furthermore the flow passages allow good flow through of water. Other suitable carriers are described in EP 1340720 and EP05785314.

The carrier elements of EP0750591 have a density close to the density of water so that the carriers with the biofilm are kept suspended and moving in the water in the reactor. This avoids that water stays stationary in the carriers and ensures that air can pass through the inner passages of the carrier.

Applicants of present invention have combined the advantages of the setup of their previous reactors with the advantages of the type of carriers as for example disclosed in EP0750591, EP 1340720 and EP05785314 to provide for an improved method of water purification that shows highly increased yield. At the same time the object of present invention is to provide for a reactor that is not increased in volume while providing for a higher yield.

The solution provided is an improved reactor and a method for biological purification of wastewater according to present invention as further described here below.

SUMMARY OF THE INVENTION

Present invention relates to a biological purifying reactor comprising a space for expansion and removal of sludge with a volume V, a gas injection system located in a lower area close to the bottom of the said space for expansion and removal of sludge, a fluid injection system located at, or above the bottom of the said space for expansion and removal of sludge and a biological filter. The biological filter comprises a packed bed of particles retained in a lower part of said reactor by a perforated retention ceiling against upward movement, and a volume of movable particles located within the said space for expansion and removal of sludge and above the bottom of the space for expansion and removal of sludge.

The particles of said packed bed and of the said volume of movable particles are carriers for microbial film.

The movable particles have a density between 900 and 1200 $kg/m^3$, preferably between 920 to 980 $kg/m^3$. The density of the packed bed particles is below 900 $kg/m^3$, more preferably below 500 $kg/m^3$.

The movable particles are hollow carriers comprising a protected surface area protected against collision with the surfaces of other carrier elements.

In a further embodiment of present invention the movable particles have a total specific surface area of between 500 and 1800 $m^2/m^3$ and a preferred range of between 600 and 1400 $m^2/m^3$ of particle element volume and flow passages designed to allow good flow of water and gas through the carriers. The unit "surface area per particle element volume" as used herein means that the surface of the movable particle is divided with the volume of the particle itself. In this application it is not referred to the unit "surface area per bulk volume of particles" that is commonly used in commercial descriptions of the characteristics of such carriers.

The movable particles furthermore preferably have a high protected surface area of between 300 and 1600 $m^2/m^3$ and a preferred range of between 500 and 1200 $m^2/m^3$ of particle element volume. Their length and width can range between 10 and 70 mm, a range between 20 and 45 mm being preferred. Their thickness ranges between 1 and 30 mm, a range between 3 and 20 mm being preferred.

In a preferred embodiment of present invention the volume V of the space for expansion and removal of sludge is between 30 and 80%, preferably between 30 and 55%, of the total volume under the perforated retention ceiling of the biological purifying reactor. In one embodiment 20-70%, preferably 30 to 65% of this volume V is filled with the movable particles.

In another preferred embodiment the particles of the packed bed are expanded particles having a density of 15-100 $kg/m^3$, preferably of 35-90 $kg/m^3$, more preferably of 60-90 $kg/m^3$ and a granulometric size of 2-6 mm. Preferred is a granulometric size of more than 3 mm to avoid clogging of the movable particles by the particles of the packed bed.

In another preferred embodiment the fluid injection system comprises holes. The size of the holes is chosen to be smaller than the chosen size of the movable particles so that the particles cannot pass through the holes and are retained by the fluid injection system.

In one preferred embodiment the biological purifying reactor comprises a second gas injection system, which is located within the packed bed of particles.

Present invention furthermore relates to a method for biological purification of wastewater comprising the first step of providing a biological purifying reactor as disclosed above.

The second step of the method of present invention consists of passing water to be biologically purified upwardly through said reactor and through the volume of movable carriers and the packed bed constituting said biological filter and simultaneously injecting gas into the space for expansion and removal of sludge and passing said gas upwardly in a co-current flow direction with said water to be biologically purified through said biological filter.

The third step of the method of present invention consists of periodically backwashing said packed bed and volume of movable carriers by using rapid outflow, in a counter-current flow direction, of the water treated and stored in an upper part of said reactor.

In one embodiment of the method of present invention, when the biological purifying reactor comprises a second gas injection system located within the packed bed of particles, gas is injected into the packed bed via the second gas injection system.

In a preferred embodiment of the method the step of backwashing is carried out at a water outflow rate of 30-100 m/h. It is possible that during the backwashing gas will be injected to improve loosening of the excess biological sludge. The injection of gas is carried out sequentially at an air flow rate of 10-100 m/h, preferably of 10-40 m/h, wherein these sequences of gas can be injected either alternating with the opening of the backwash water valve or simultaneously while the backwash water valve is open.

In one embodiment the method further comprises the step of periodically carrying out brief-miniwashing flushing operations to loosen suspended solids within said packed bed and volume of movable particles and enable a longer operation between two backwash cycles.

The present invention furthermore relates to a water treatment plant comprising one or more batteries of bioreactors as described above. Each battery of bioreactors comprises 1-20 that are in parallel operation. Preferred for smooth running is the application of 4-14 bioreactors in one battery in parallel operation.

The water treatment plant according to present invention can comprise between 1 to 10 batteries of bioreactors.

In a further embodiment the backwashing operation in the water treatment plant is carried out for one bioreactor per battery at a time. The use of several batteries allows the backwashing operation of more than one bioreactor at a time, even though only one bioreactor per battery can be backwashed at a time.

DETAILED DESCRIPTION OF THE INVENTION

Figure 1:
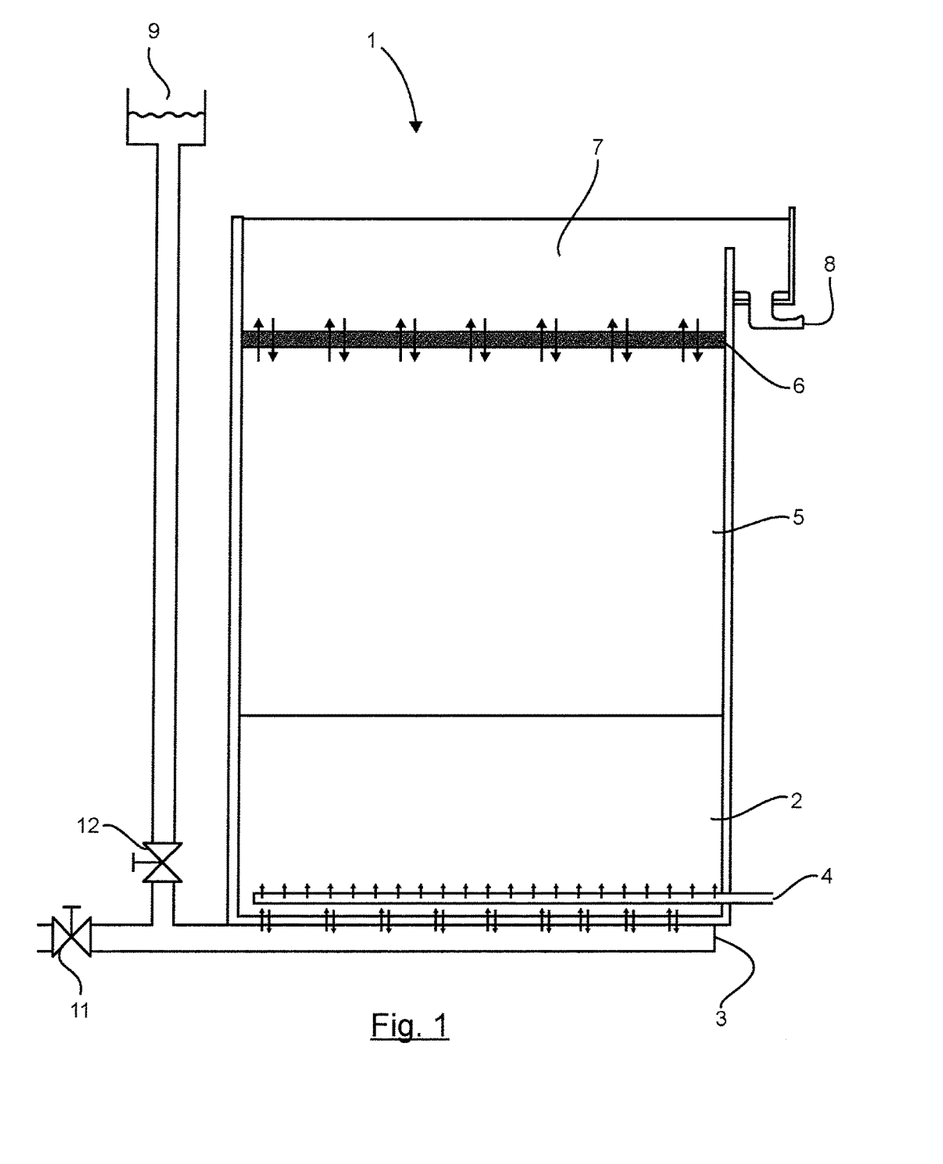
FIG. 1 shows a sectional view of a bioreactor according to prior art EP0504065.
Figure 2:
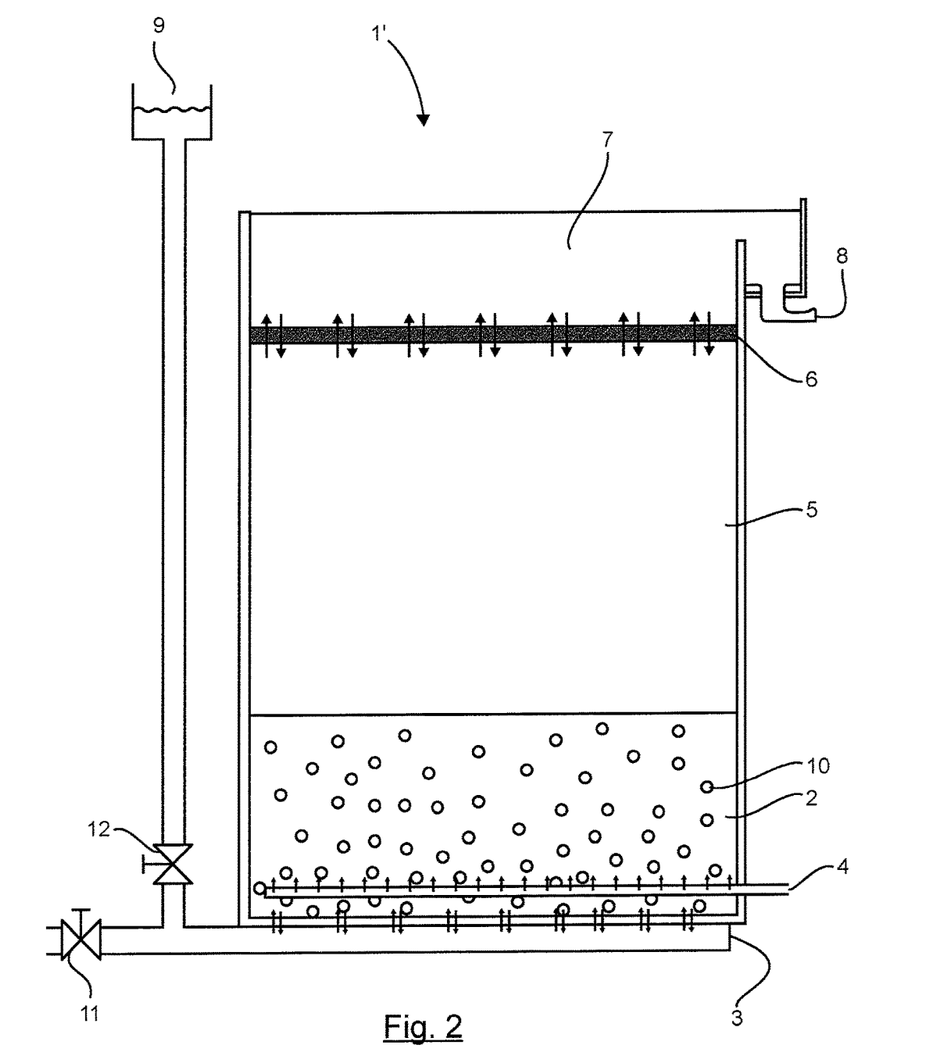
FIG. 2 shows a sectional view of a bioreactor according to one embodiment of present invention.
Figure 5:
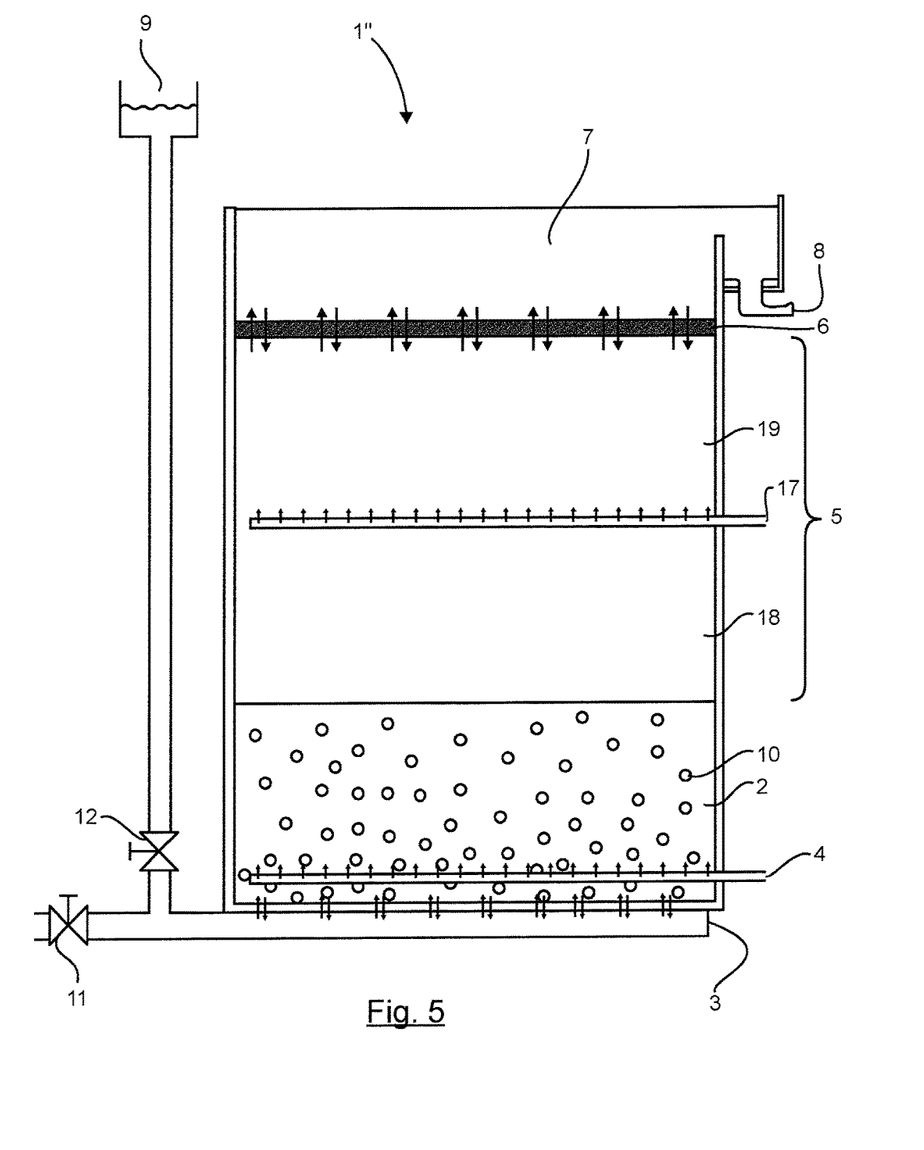
FIG. 5 shows a sectional view of a bioreactor according to one embodiment of present invention.

According to the figures provided, the prior art bioreactor 1 shown in FIG. 1 and the bioreactors according to two preferred embodiments of present invention 1' and 1" shown in FIGS. 2 and 5 comprise in their lower part the space 2 for the expansion and removal of the sludge, the fluid injection system 3, the gas injection system 4 and the packed bed 5 retained by the perforated plate 6 acting as a ceiling; and, finally, the free upper zone 7 acting as a washing reserve where the treated water is removed via outlet 8.

The fluid injection system 3 serves at the same time as the system for sludge out take during backwashing operation of the bioreactor as indicated by the arrows in both directions in FIGS. 1, 2, 4A, 4B and 5.

The liquid to be treated arrives via inlet 9 and is introduced via valve 12 into the zone 2 through the fluid injection system 3 beneath the gas injection device 4. When the gas is introduced by the gas injection device 4, an intensive exchange is obtained between the gas, the water to be treated and the biofilm that clings to the particles. During this operation, the packed bed 5 stays in a non-turbulent state. It is therefore a "fixed bed".

Now referring to FIGS. 2 and 5, in the bioreactor of present invention the space 2 for the expansion and removal of the sludge is filled partly with hollow carriers 10. These form what is in present invention referred to as a "volume of movable particles". However, other than described above for the packed bed 5, this volume of movable particles does not form a fixed bed, but the hollow carriers 10 can move freely. This means that when the gas is introduced at the base by the gas injection system 4, the volume of movable particles will be in a turbulent state and the hollow carriers 10 will be moved around in the space 2 by the current. Furthermore, due to the fact that these hollow carriers 10 have flow through passages, not only does the water and gas move the carriers around in the space 2, but it also flows through the hollow carriers 10 so that all inner surface areas of these hollow carriers 10 will be in contact with the water and the gas. This maximizes the contact of the water to be treated with the biofilm surface that is present on all surfaces, outer and inner surfaces, of the hollow carriers 10. The inner surfaces of the hollow carriers are referred to as the "protected surface area" to emphasize the fact that these surfaces do not get harmed by the free movement of the carriers in the water and their resulting collisions. In contrast to that there is the "total surface area" which refers to the total surface area that is available for biofilm formation on the hollow carriers 10 and thus includes all inner and outer surfaces.

Now referring again to both FIGS. 1, 2 and 5, due to the accumulation of suspended solids and the biological growth within the packed bed 5 and the hollow carriers 10, the material gradually gets clogged. The increase in the load loss may be followed by manometrical measurement or by the rising of the level of liquid in the loading or load loss measuring column at inlet 9.

When a predefined load loss value is reached, the washing of the bed is started. Washing means the removal of excess sludge from the particles of the biofilter, which leaves the bioreactor through the pipe/channel system located at the bottom of the reactor. This pipe system is connected to a flush valve 11. To start the washing, valve 12 is closed and valve 11 is opened to a predefined position until the desired washing speed is obtained. The rapid outflow, in a counter-current flow direction, of the liquid treated and stored in the upper part 7 of the reactor enables the expansion of the material of the packed bed 5. For the granulometric size and density of the material of the packed bed 5 as defined here above, a washing speed of 30 to 100 m/h is chosen. This washing speed is equally suitable for the hollow carriers 10 located in the space for expansion and sludge removal 2.

The volume of the normal expansion zone needed for the packed bed 5 during backwash is less than the volume of the space for expansion and sludge removal 2.

This means that during backwash the freely moving hollow carriers 10 will move around going mostly towards the bottom of the reactor and thereby leaving enough space for the particles of the packed bed to be fluidized without being limited in their movement. The movement of the hollow carriers 10 towards the bottom can furthermore "behave" as an additional protection grid, in those very rare cases where particles from the packed bed 5 located above will move further down towards the sludge outlet system 3.

As already described above it is to be understood that the fluid injection system 3 serves at the same time as the system for sludge out take during backwashing operation of the bioreactor as indicated by the arrows in both directions in FIGS. 1, 2, 4A, 4B and 5.

The space 2 is generally provided with a relatively high volume compared to the total volume under the perforated retention ceiling of the biological purifying reactor of around 30-50% in the prior art solutions to avoid loss of particles during the backwashing process. In present invention, however, this space is being used more efficiently by filling 20-70%, preferably 30-65%, of this volume with the hollow carriers 10 thus providing for more biologically active surface while keeping the same total volume of the bioreactor. Taking into account the prior art solutions, one would expect that minimizing the volume of the free space 2 would lead to a higher loss of particles of the packed bed during backwashing, since this space is generally considered to be required for the expansion of the packed bed particles during backwash as described above. However, according to present invention the hollow carriers 10 are retained in the reactor by the fluid injection system 3, due to the fact that the size of the holes 15 (shown in FIGS. 4A and B) of the fluid injection system 3 is chosen to be smaller than the smallest diameter of the hollow carriers used. The fluid injection system 3 thus functions simultaneously as a protection grid preventing the hollow carriers 10 from being washed out of the reactor. The preferred size for the holes 15 of the fluid injection system 3 ranges from 6 to 60 mm in diameter.

At the same time the hollow carriers 10 that move downwards during backwash act as an additional protection grid for the particles of the packed bed 5 preventing them from reaching the sludge outlet system 3. It is very important for the smooth running of the reactor of present invention that the hollow carriers provide for this extra barrier preventing the particles of the packed bed 5 to exit the reactor. In this regard it is extremely important to carefully select the right combination of hollow carriers and particles for the packed bed. The particles of the packed bed have to be chosen so that they cannot enter the inner flow passages of the hollow carriers, which would lead to clogging of the hollow carriers and a decrease in efficiency of the reactor. This means that the size of the particles of the packed bed has to be larger than the largest inner flow passage present in the hollow carriers, or vice versa the hollow carriers have to be chosen so that their inner flow passages are smaller than the smallest particle of the packed bed.

Another important parameter to keep in mind when selecting suitable hollow carriers and particles for the packed bed is the density of the particles. As density is depended on temperature and pressure the density ranges of this application are determined for 4° C. and normal atmospheric pressure. As described above the density of the hollow particles ranges from 900 to 1200 kg/m$^3$, preferably between 920 to 980 kg/m$^3$. Furthermore the density of the packed bed particles is below 900 kg/m$^3$, more preferably below 500 kg/m$^3$. This will minimize the mixing of the two types of particles during normal operation and backwashing.

In a preferred embodiment the density of the packed bed particles ranges from 15-100 kg/m$^3$, preferably from 35-90 kg/m$^3$, more preferably from 60-90 kg/m$^3$. This low density ensures that the particles of the packed bed float upwards to the water surface if not retained. The particles thus return very quickly, within seconds, to their location under the retention ceiling after backwash, whereas the more dense hollow particles are kept suspended and moving in the water under the packed bed. In addition, due to the low density of the particles of the packed bed the upward force of these particles is very high. The packed bed is therefore very compact and an almost completely fixed bed. The filtration capacity of this packed bed is thus very high. Furthermore the density difference between the two different kinds of particles ensures that the mixing of the two kinds of particles during normal operation of the reactor is extremely limited.

In present invention to achieve the organization of the two types of particles and the formation of a highly compact packed bed there is no additional upflow of air or water necessary. It is therefore not necessary to control and adjust the flow to maintain the bioreactor itself in a functional state. The flow can thus be purely adjusted to achieve optimal water treatment efficiency. In contrast to that, conventional prior art reactors containing a fixed and fluidized bed of particles having a density closer to the density of water, usually require an additional upflow of air or water to keep the lower bed fluidized and the upper bed packed. Furthermore, the reorganization of the two beds after backwash is not achieved as quickly as in the case of the packed bed and the movable carriers in present invention.

A further disadvantage of using particles that have a density closer to the density of water and thus having a less compact fixed bed is that when injecting air for purification of the wastewater, the injected air can form "pathways" in the fixed bed. These "pathways" will decrease the treatment efficiency of the fixed bed. In present invention this does not happen. Furthermore, due to the fact that the packed bed is so compact, the air bubbles take longer to move through the packed bed. This increases the time for oxygen transfer from the air to the water thus increasing the activity of the biofilm.

Now referring back to the operation of the bioreactor shown in FIGS. 2 and 5, the rapid change to a counter-current flow makes it possible to carry along the solids stored in the interstitial spaces and dislodge the excess biomass that has collected on the surface of the materials, but the above-mentioned range of speed makes it possible to preserve the active biofilm on the materials. After the draining of the reserve 7 and the closing of the valve 11, it is possible to restart the feeding by opening valve 12 with a load similar to the one used before washing.

Another advantage of using a counter-current backwash is that the particles in the upper part of the packed bed do not come into contact with the pollutants, since during operation only purified water reaches these parts of the packed bed, whereas the main part of the pollutants stays in the lower part during operation. Then during backwash, the pollutants are moved downwards again so that the upper part of the packed bed will not get into contact with the pollutants during backwash either. In contrast to that a co-current backwash brings all of the packed bed particles in contact with the total pollutants, thus decreasing the efficiency of the packed bed. In addition, pollutants reach and can clog the retention ceiling when co-current backwash is used. During counter current backwash the retention ceiling is spared.

A recycling of the purified effluent by a pump may, if necessary, enable the distribution to be improved or may enable the supply of nitrates in the prefiltration zone.

To extend the periods of time between the washings, very brief flushing operations, by the opening of the valve 11, may be done periodically to loosen the material and enable a deeper penetration of the impurities into the filtering bed. These mini-washing operations will further unclog the lower part of the filter, which is more charged with suspended solids. The fast flushing operations may be implemented in such a way as to provide for a balanced load loss throughout the height of the filtering beds.

Sequential gas injection may be maintained during the washing to aid with the unclogging of the packed bed as well as the hollow carriers. Short sequences of air during backwashing will shake up the hollow carriers and prevent their clogging. The sequences of air can be introduced during a pause in the wash water inlet as for example described in the preferred embodiment below, or can be introduced in sequences while the wash water is running continuously.

In a preferred embodiment of present invention the backwash procedure includes the following steps:

a) Pre-wash with water alone

This operation, during which the filter is switched out, consists of a pre-wash (with water alone) by opening the wash water drain valves for a predetermined period of time, T0, in order to loosen the sludge before injecting the air for mixing.

b) Loosening of sludge with air alone

This step, during which the wash water drain valves are closed, consists of injecting air into the air system to mix the excess sludge and loosen it. This step lasts T2.

c) Pausing

Pausing to let loosened material settle for the time T14 d) Cleaning by alternating water and air phases

This step consists of the successive injection of:
Water alone for T1
Air alone for T2
Pausing for T14
Water alone for T1
Air alone for T2
Pausing for T14

These phases are designed to loosen all the excess sludge and to evacuate it partially towards the filter medium. Additional water scour phases (pre-set time T1) and an air scour phase (pre-set time T2) and a pause (pre-set time T14) can be added to obtain more thorough washing.

e) Rinsing with water alone

This phase consists in evacuating residual excess sludge with a descending flow of water for a time T3.

The backwash sequence terminates when T3 has elapsed. Depending on the actual filtration velocity, the filter is either then put back into filtration mode or put into standby mode.

One of many advantages of the use of freely moving hollow carriers instead of a second fluidized or fixed bed in the reactor are that only minor additional barometrical headloss is introduced during normal operation of the bioreactor by these movable carriers. This leads to less energy consumption for aeration of the bioreactor.

Last but not least the hollow carriers provide for an improved distribution and a slower movement of the gas upwards towards the packed bed, since gas bubbles will be split into smaller bubbles when coming into contact with the freely moving hollow carriers in the lower part of the reactor. This ensures improved supply of the biofilm with gas thus resulting in higher efficiency of the reactor.

The hollow carriers furthermore reduce the clogging of the packed bed with total suspended solids (TSS), since the produced and accumulated biomass on the hollow carriers will be removed during backwashing. Furthermore, since less COD reach the packed bed, the growth of biomass is slower on the packed bed particles than in the conventional bioreactor as shown in FIG. 1 where only a packed bed is used. This minimizes the backwash frequency and therewith also the wash water load needing to be discarded.

Figure 3:
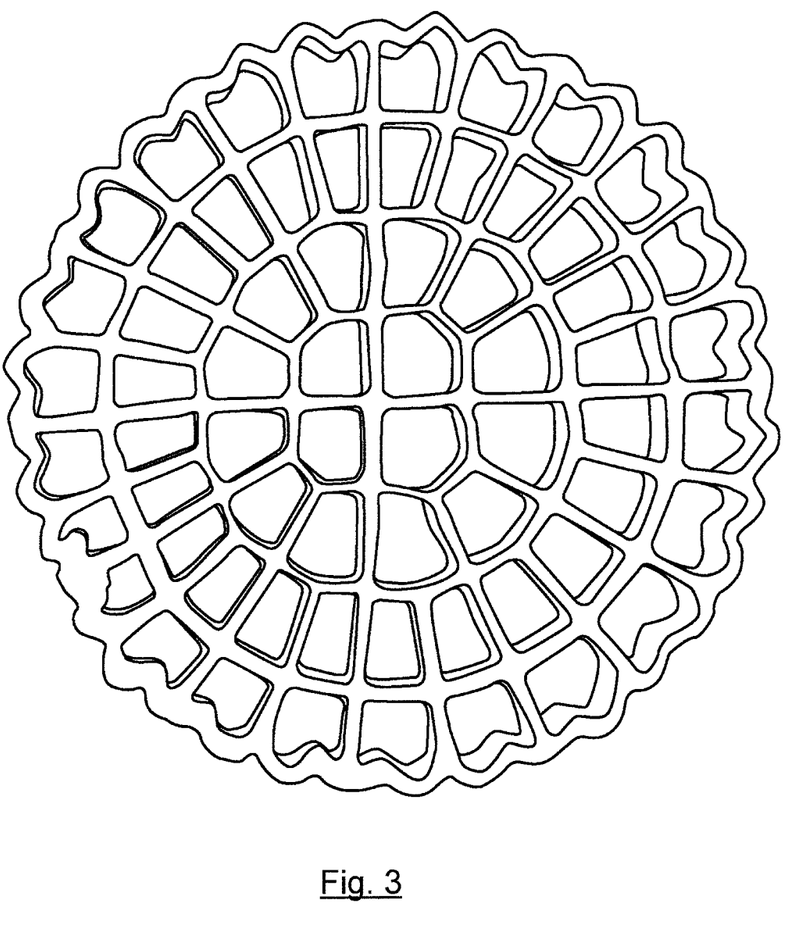
FIG. 3 shows a sectional view of a preferred embodiment of the hollow carriers as used to form the volume of movable particles in present invention.

In FIG. 3 a side view of an exemplary hollow carrier suitable for use in present invention is shown. The structure shows outer and inner walls of the carrier that are suitable for growth of biofilm. As can be readily understood from this drawing, biofilm that grows on inner surfaces of the carrier will be protected from being harmed via collision with other carriers during operation of the bioreactor.

Figure 4A:
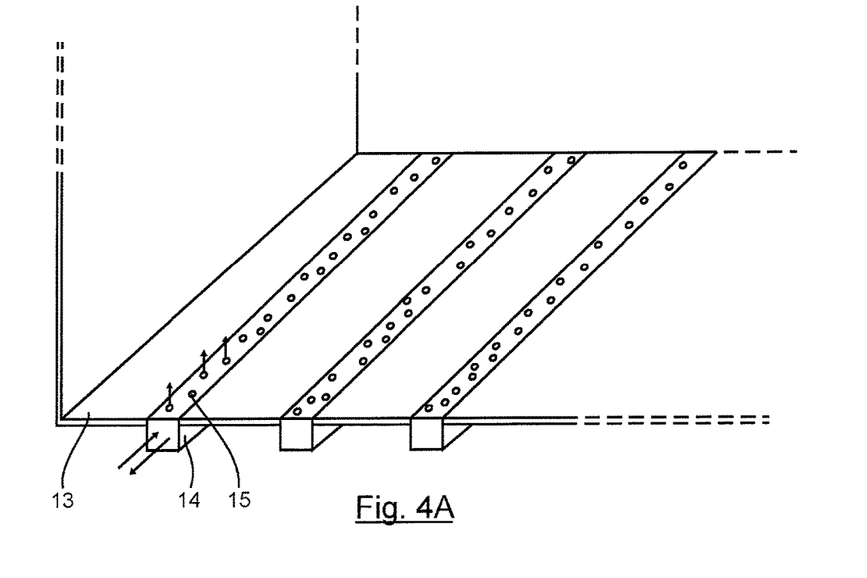
FIGS. 4A and B show a perspective view of the bottom of the bioreactor and its alternative fluid injection systems.
Figure 4B:
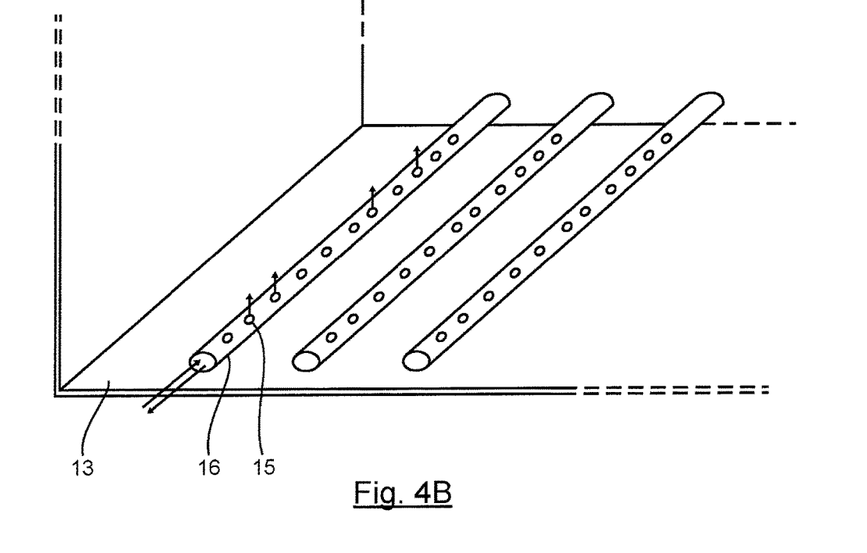

In FIGS. 4A and B two alternative fluid injection systems are shown. In FIG. 4A a fluid injection system made of concrete is shown which is according to the fluid injection system shown in the bioreactor in FIG. 2. The fluid injection system can for example be made of concrete, or other suitable materials known in the art. At the bottom of the bioreactor 13 inlet channels 14 with holes 15 are formed. In FIG. 4B, which is an alternative solution, pipes 16 with holes 15 are inserted at or above the bottom of the bioreactor. These pipes can for example be made of steel or plastic, or other suitable materials known in the art. In both embodiments the water inlet channels function also as the sludge outlet channels during backwash as indicated by the arrows pointing in both directions. The size of the holes 15 is chosen to be smaller than the chosen size of the movable particles 10 so that the particles cannot pass through the holes 15 and are retained by the fluid injection system 3. During backwash, when the movable particles 10 are pressed down towards the bottom of the reactor, they are retained by the fluid injection system 3 avoiding loss of the valuable movable particles 10.

FIG. 5 shows an alternative embodiment of the reactor of present invention, which functions in the same way as the bioreactor as shown in FIG. 2, with the difference being that it comprises a second air injection system 17 located within the packed bed 5. When the bioreactor is operated and air introduced via the air injection system 4 and the second air injection system 17, the packed bed 5 will comprise an aerated zone 19 and a non aerated zone 18 within the packed bed as shown in FIG. 5. Within the aerated zone 19 nitrification using $O_2$ from the injected air can take place. When no aeration from the air injection system 4 takes place, an anoxic zone, i.e. a zone with oxygen coming from $NO_3$—N alone, can be assured allowing for removal of nitrates (denitrification) when the oxygen from the $NO_3$—N instead of the oxygen supplied by aeration is used for carbon removal. It is to be understood that the second air injection system 17 does not serve for air injection during backwashing, but only during normal operation of the bioreactor. As described above for the embodiment with only air injection system 4, also in this embodiment, where air is introduced additionally or exclusively through air injection system 17, an intensive exchange is obtained between the gas, the water to be treated and the biofilm that clings to the particles. During this operation, the packed bed 5 stays in a non-turbulent state and is therefore a "fixed bed".

According to an advantageous embodiment of the method of present invention, one or more batteries of bioreactors as described above are set up in parallel in one large water treatment plant. Each battery of parallel bioreactors in one large water treatment plant can contain from 1-20 bioreactors. However, an amount of 4-14 bioreactors per battery is preferred. One to 10 batteries of bioreactors can be implemented in parallel in one water treatment plant.

Each battery of bioreactors has one common water reservoir that feeds the loading columns individually associated with each bioreactor. This way excess pressure in the bioreactors can be prevented when one column is clogged, since the other loading columns can compensate the pressure.

The water reserves for the purified water of each bioreactor are also interconnected and form one big compartment for purified water at the top of each battery. Thus, the purified water of all the bioreactors in operation in one battery supplies the flow of water for the backwashing of the clogged bioreactor that at that time is being backwashed.

It is preferred for the smooth running of the water treatment plant of present invention that only one bioreactor at a time is backwashed while the other bioreactors are in normal water treatment operation. The use of several batteries in parallel allows the backwashing of more than one bioreactor per plant at a time, even though only one bioreactor per battery can be backwashed at a time, which increases the efficiency of the treatment plant.

EXAMPLE

A test run was made to measure the efficiency for removal of total suspended solids (TSS) and soluble COD of the biological purifying reactor of present invention as shown in FIG. 2.

The reactor used for the test-run was a 0.9 m diameter column of 6.5 m height. The reactor had 3.5 m of packed bed using a spherical media with a diameter of 4.5 mm and a density of 55 kg/m$^3$. The volume below the packed bed having a height of 1.9 m was filled with 35% of hollow carriers with a density of 960 kg/m$^3$ and protected surface area of 800 m$^2$/m$^3$. The reactor was fed with municipal wastewater coming from the primary settler of the St. Thibaut des Vignes WWTP (France) and the total suspended solids (TSS) and Soluble Chemical Oxygen Demand (Filtered COD) content of the wastewater before and after the reactor was measured.

The reactor was seeded during 3 weeks at 1 m/h of influent flow and when sufficient activity had been documented the load to the reactor was increased in several steps. 24 hour average samples were taken during the highest loading of the plant.

The result of the test run is shown in tables 1 and 2 below. The results are shown in comparison to the standard design values and results as expected from the biological purifying reactor as disclosed in the prior art as shown in FIG. 1.

TABLE 1

Comparison of efficiency for removal of total suspended solids (TSS) by the biological purifying reactors as disclosed in the prior art (FIG. 1) and in present application (FIG. 2).

| | TSS Load (kg/m$^3$/d) | TSS Influent (mg/l) | TSS Effluent (mg/l) | Removal Rate (%) | Cycle Duration (h) |
|---|---|---|---|---|---|
| Prior art reactor (FIG. 1) | 2.7 | 100 | 25 | 75 | 24 |
| Reactor of present invention (FIG. 2) | 6 | 200 | 70 | 65 | 24 |

TABLE 2

Comparison of efficiency for removal of COD by the biological purifying reactors as disclosed in the prior art (FIG. 1) and in present application (FIG. 2).

| | CODsol Load (kg/m$^3$/d) | CODsol Influent (mg/l) | CODsol effluent (mg/l) | Removal Rate (%) | Cycle Duration (h) |
|---|---|---|---|---|---|
| Prior art reactor (FIG. 1) | 2.9 | 200 | 50 | 75 | 24 |
| Reactor of present invention (FIG. 2) | 6 | 170 | 60 | 65 | 24 |

It should be noted that the St. Thibaut des Vignes WWTP has a high degree of industrial influent coming into the WWTP leading to a relatively large non-degradable fraction of soluble COD in the incoming wastewater. Hence the amount of soluble COD in the effluent is slightly higher than the amount that would be expected from a more "classical" municipal wastewater, leading to a lower achieved removal rate for this parameter. Such "classical" municipal wastewater was used for obtaining the efficiency data for the biological purifying reactor as disclosed in the prior art and shown in FIG. 1.

The invention claimed is:

1. A method of biologically treating wastewater and removing suspended solids from the wastewater in a bioreactor, comprising:
   in a purification mode:
      directing the wastewater into a bottom portion of a bioreactor via a wastewater injection system that includes an array of openings that permits the wastewater to be injected into the bioreactor;
      injecting air into the bioreactor;
      directing the wastewater and air upwardly through an expansion space containing moveable hollow biofilm carriers and through flowthrough passages in the moveable hollow biofilm carriers;
      directing the wastewater and air upwardly from the expansion space through a packed bed of biofilm carriers generally disposed over the expansion space and having a density less than the density of the moveable hollow biofilm carriers contained in the expansion space and wherein the biofilm carriers of the packed bed are larger than the flowthrough passages of the moveable hollow biofilm carriers;
      retaining the packed bed of biofilm carriers under a perforated screen in the bioreactor;
      forming a biofilter with the packed bed of biofilm carriers and the moveable hollow biofilm carriers;
      as the wastewater moves upwardly through the expansion space and the packed bed of biofilm carriers, collecting suspended the solids in the biofilter and collecting treated wastewater in a space in the bioreactor; and
   in a backwashing mode:
      removing the suspended solids retained by the biofilter through backwashing where at least some of the treated water held in an upper space in the bioreactor is employed as a backwash;
      directing the backwash downwardly through the packed bed of biofilm carriers and through the expansion space and the moveable hollow biofilm carriers contained therein and expanding the packed bed of biofilm carriers into the expansion space;

entraining the suspended solids retained by the biofilter in the backwash;

discharging the backwash containing the suspended solids from the bioreactor by directing the backwash and entrained suspended solids through the array of openings in the wastewater injection system;

preventing the discharge of the moveable hollow biofilm carriers with the backwash; and forming a protection grid in the bioreactor with the moveable hollow biofilm carriers and generally preventing the biofilm carriers of the packed bed from passing through the protection grid of the moveable hollow biofilm carriers and being discharged from the bioreactor with the backwash through the array of openings in the wastewater injection system.

2. The method of claim 1 including nitrifying and denitrifying the wastewater by:

forming an anoxic zone in the bioreactor;

wherein injecting air into the bioreactor includes injecting air into the bioreactor at a point above the anoxic zone;

denitrifying the wastewater by passing the wastewater through the anoxic zone and providing no air to the anoxic zone; and nitrifying the wastewater by passing the wastewater through a nitrification zone disposed over the anoxic zone and injecting air into the wastewater passing through the nitrification zone.

3. The bioreactor of claim 2 wherein the biofilm carriers of the packed bed have a density of 60-90 $kg/m^3$ and wherein the biofilm carriers of the packed bed are expanded particles having a granulametric size of 2-6 mm.

4. The bioreactor of claim 2 wherein the wastewater injection system includes a series of elongated and spaced apart channels extending adjacent the bottom of the bioreactor and wherein the array of openings of the wastewater injection system are formed in the series of channels.

5. The method of claim 1 further including backwashing the biofilter through a series of steps in the following order:

Step 1: loosening the suspended solids held in the biofilter by instituting a pre-wash phase wherein the pre-wash phase includes directing only water downwardly through the packed bed of biofilm carriers and the moveable hollow biofilm carriers;

Step 2: after the pre-wash phase, further loosening the suspended solids held in the biofilter by injecting air into the biofilter;

Step 3: after Step 2, settling the suspended solids by implementing a pause phase for a selected period of time where neither air nor the treated wastewater is directed through the biofilter;

Step 4: cleaning the biofilter by employing an alternating process comprising a treated wastewater backwashing process and an air injection process where in the first phase of Step 4, the treated wastewater is directed downwardly through the biofilter cleaning suspended solids therefrom, and in a second phase of Step 4, only air is injected into the biofilter, and wherein as a part of Step 4 the first and second phases are repeated; and Step 5: after Step 4, rinsing the biofilter with the treated wastewater.

6. The method of claim 1 wherein during the purification mode the moveable hollow biofilm carriers are not fluidized.

7. The method of claim 1 wherein the biofilter is backwashed at a washing speed of 30-100 m/h.

8. A bioreactor operative in a first mode to treat wastewater and remove suspended solids from the wastewater and operative in a second mode to perform a backwashing operation comprising:

a packed bed of biofilm carriers disposed in the bioreactor;

an expansion space in the bioreactor below the packed bed of biofilm carriers;

moveable hollow biofilm carriers disposed in the expansion space below the packed bed of biofilm carriers and having a density greater than the density of the packed bed of biofilm carriers:

wherein the moveable hollow biofilm carriers include flowthrough passages smaller than the biofilm carriers of the packed bed;

an air injection system for injecting air into the bioreactor;

a wastewater injection system including an array of openings and configured to inject wastewater into the reactor wherein the wastewater and air move upwardly through the expansion space, the flowthrough passages of the moveable hollow biofilm carriers, and the packed bed of biofilm carriers;

wherein the array of openings of the wastewater injection system are smaller than the moveable hollow biofilm carriers;

wherein the packed bed of biofilm carriers forms at least a part of a biofilter for removing suspended solids from the wastewater moving upwardly through the biofilter;

a protection grid formed in a lower portion of a bioreactor by the moveable hollow biofilm carriers and configured to generally prevent the packed bed of biofilm carriers from passing through the protection grid and being discharged with a backwash through the array of openings in the wastewater injection system;

wherein in the first mode wastewater enters the wastewater injection system and moves upwardly through the packed bed of biofilm carriers that remove suspended solids from the wastewater; and wherein in the second mode the wastewater injection system and the array of openings thereof are also configured to discharge the backwash and the suspended solids entrained in the backwash during the backwashing operation and wherein the protection grid generally prevents the packed bed of biofilm carriers from passing through the protection grid and being discharged with the backwash.

* * * * *